(12) United States Patent
Dare

(10) Patent No.: US 7,869,940 B2
(45) Date of Patent: Jan. 11, 2011

(54) METHOD AND SYSTEM FOR GATHERING AND PROCESSING DATA FOR ROAD USE CHARGING

(75) Inventor: Peter Roy Dare, Liphook (GB)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 11/574,511

(22) PCT Filed: Sep. 23, 2005

(86) PCT No.: PCT/EP2005/054783

§ 371 (c)(1),
(2), (4) Date: Mar. 1, 2007

(87) PCT Pub. No.: WO2006/045678

PCT Pub. Date: May 4, 2006

(65) Prior Publication Data

US 2007/0250259 A1 Oct. 25, 2007

(30) Foreign Application Priority Data

Oct. 27, 2004 (GB) .................................. 0423793.9

(51) Int. Cl.
*G01C 21/00* (2006.01)
(52) U.S. Cl. ........................ 701/201; 701/200; 705/412; 705/417; 702/150; 702/158; 340/10.1; 340/928; 235/384
(58) Field of Classification Search ......... 701/200–201; 705/412, 417; 702/150, 158; 235/384; 340/10.1, 340/928
See application file for complete search history.

(56) References Cited

U.S. PATENT DOCUMENTS 6,098,015 A * 8/2000 Nimura et al. .............. 701/209

(Continued)

FOREIGN PATENT DOCUMENTS

DE 10131841 A1 1/2003

(Continued)

OTHER PUBLICATIONS

Applying a vehicle classification algorithm to model long multiple trailer truck exposure; Regehr, J.D.; Montufar, J.; Middleton, D.; Intelligent Transport Systems, IET; vol. 3, Issue 3, Sep. 2009 pp. 325-335; Digital Object Identifier 10.1049/iet-its.2008.0066.*

(Continued)

*Primary Examiner*—Cuong H Nguyen
(74) *Attorney, Agent, or Firm*—Schmeiser, Olsen & Watts; William H. Steinberg

(57) ABSTRACT

A method for processing road use data. A first moving vehicle has an encounter with vehicles in motion. An apparatus in the first vehicle generates and stores encounter records for the encounters. Each encounter record includes a location of the first moving vehicle and a location and identifier of a corresponding vehicle in motion, and is stored in the apparatus. A first encounter record for an encounter between the first moving vehicle and a second moving vehicle is sent by the first moving vehicle to a charging system of a road use charging authority having a data store. If the charging system determines that the data store includes a second encounter record of the encounter received from the second moving vehicle, then the second encounter record is not used in a charging process and/or is deleted from the data store; otherwise, the first encounter record is stored in the data store.

24 Claims, 6 Drawing Sheets

U.S. PATENT DOCUMENTS

| | | | |
|---|---|---|---|
| 6,356,207 B1 * | 3/2002 | Oouchi | 340/928 |
| 6,373,962 B1 * | 4/2002 | Kanade et al. | 382/105 |
| 6,617,980 B2 * | 9/2003 | Endo et al. | 340/905 |
| 7,246,007 B2 * | 7/2007 | Ferman | 701/200 |
| 2003/0101103 A1 * | 5/2003 | Otsubo | 705/26 |
| 2004/0046019 A1 * | 3/2004 | Kojima | 235/384 |
| 2004/0093289 A1 | 5/2004 | Bodin | |
| 2004/0230480 A1 * | 11/2004 | Kanayama | 705/13 |
| 2005/0043880 A1 * | 2/2005 | Yamane et al. | 701/200 |
| 2005/0216147 A1 * | 9/2005 | Ferman | 701/29 |
| 2006/0001552 A1 * | 1/2006 | Kojima | 340/928 |
| 2006/0064243 A1 * | 3/2006 | Hirose | 701/211 |
| 2006/0224300 A1 * | 10/2006 | Shioya et al. | 701/200 |
| 2007/0093956 A1 * | 4/2007 | Kim | 701/200 |
| 2007/0250259 A1 * | 10/2007 | Dare | 701/201 |
| 2007/0252726 A1 * | 11/2007 | Kojima | 340/928 |
| 2010/0123552 A1 * | 5/2010 | Kaufman et al. | 340/10.1 |
| 2010/0123565 A1 * | 5/2010 | Kaufman et al. | 340/426.24 |

FOREIGN PATENT DOCUMENTS

| | | | |
|---|---|---|---|
| JP | 05314337 A | * | 11/1993 |
| JP | PUPA H-8287394 A | | 11/1996 |
| JP | 2002-260227 | * | 9/2002 |
| JP | PUPA 2004094780 A | | 3/2004 |
| JP | 2004280215 A | * | 10/2004 |
| WO | WO01/35371 A1 | | 5/2001 |

OTHER PUBLICATIONS

Apply Cellular Wireless Location Technologies to Traffic Information Gathering;Guo Li mei; Luo Da yong; Intelligent Computation Technology and Automation, 2009. ICICTA '09. Second International Conference on; vol. 3, Oct. 10-11, 2009 pp. 499-502; Digital Object Identifier 10.1109/ICICTA.2009.586.*

Traffic Estimation And Prediction Based On Real Time Floating Car Data; de Fabritiis, C.; Ragona, R.; Valenti, G.; Intelligent Transportation Systems, 2008. ITSC 2008. 11th International IEEE Conference on; Oct. 12-15, 2008 pp. 197-203 Digital Object Identifier 10.1109/ITSC.2008.4732534.*

Wits: A Wireless Sensor Network for Intelligent Transportation System; Wenjie Chen; Lifeng Chen; Zhanglong Chen; Shiliang Tu; Computer and Computational Sciences, 2006. IMSCCS '06. First International Multi-Symposiums on; vol. 2, Jun. 20-24, 2006 pp. 635-641; Digital Object Identifier 10.1109/IMSCCS.2006.286.*

Inter-Vehicle Data Dissemination in Sparse Equipped Traffic; Chawathe, S.S.; Intelligent Transportation Systems Conference, 2006. ITSC '06. IEEE; Sep. 17-20, 2006 pp. 273-280; Digital Object Identifier 10.1109/ITSC.2006.1706754.*

Towards fair and efficient charging for heavy goods vehicles; Dodoo, N.A.; Thorpe, N.; Road Transport Information and Control, 2004. RTIC 2004. 12th IEE International Conference on; Apr. 20-22, 2004 pp. 231-236.*

Drivers' responses to road-user charges using global positioning system (GPS) technology; Thorpe, N.; Hills, P.J.; Road Transport Information and Control, 2000. Tenth International Conference on (Conf. Publ. No. 472); Apr. 4-6, 2000 pp. 131-138.*

IEEE Standard for Common Incident Management Message Sets for Use by Emergency Management Centers; 2006 pp. 0_1-524; Digital Object Identifier 10.1109/IEEESTD.2006.224678.*

Systematic Message Schedule Construction for Time-Triggered CAN; Schmidt, K.; Schmidt, E.G.; Vehicular Technology, IEEE Transactions on; vol. 56 , Issue: 6 , Part: 1; Digital Object Identifier: 10.1109/TVT.2007.906413; Publication Year: 2007 , pp. 3431-3441.*

Multi-agent System based Urban Traffic Management; Balaji, P.G.; Sachdeva, G.; Srinivasan, D.; Chen-Khong Tham; Evolutionary Computation, 2007. CEC 2007. IEEE Congress on; Digital Object Identifier: 10.1109/CEC.2007.4424683 Publication Year: 2007 , pp. 1740-1747.*

A novel fuzzy controller to improve comfort feature of vehicle; Qingmei Yang; Jiammin Sun; Industrial Electronics and Applications, 2009. ICIEA 2009. 4th IEEE Conference on; Digital Object Identifier: 10.1109/ICIEA.2009.5138769 Publication Year: 2009 , pp. 3089-3092.*

A Future View of a Multi-Camera Tracking System in "Organized Session: SICE City"; Watada, J.; Musa, Z.B.; SICE-ICASE, 2006. International Joint Conference; Digital Object Identifier: 10.1109/SICE.2006.314610; Publication Year: 2006 , pp. 4870-4876.*

Multiple Processors License Plate Recognition System for Intelligent Transportation Management ; ZeWei Liu; HaiDong Fu; Mei Xie; Intelligent Information Technology Application, 2008. IITA '08. Second International Symposium on; vol. 1 Digital Object Identifier: 10.1109/IITA.2008.80; Publication Year: 2008 , pp. 333-336.*

Promotion of the development of safe driving support system with close collaboration between ITS engineers and social scientists; Washino, S.; Vehicular Electronics and Safety, 2008. ICVES 2008. IEEE International Conference on Digital Object Identifier: 10.1109/ICVES.2008.4640855; Publication Year: 2008 , pp. 108-113.*

Calibration and validation of PARAMICS for freeway using toll data; Li Zhe; Liu Hao; Zhang Ke; Intelligent Transportation Systems, 2009. ITSC '09. 12th International IEEE Conference on; Digital Object Identifier: 10.1109/ITSC.2009.5309678 Publication Year: 2009 , pp. 1-6.*

Study of toll-by-load policy effects on vehicle type constitution of parallel network; Chen Liang; Li Qiaoru; Li Xiaoxiao; Zhi Xuejun; Automation and Logistics, 2009. ICAL '09. IEEE International Conference on; Digital Object Identifier: 10.1109/ICAL.2009.5262616; Publication Year: 2009 , pp. 2101-2104.*

* cited by examiner

METHOD AND SYSTEM FOR GATHERING AND PROCESSING DATA FOR ROAD USE CHARGING

FIELD OF THE INVENTION

The invention relates to the field of traffic management systems and in particular to a method and a system for gathering and processing data for road use charging.

BACKGROUND OF THE INVENTION

The benefits of road user pricing have been set out in numerous government documents within the UK and other countries. As an alternative to tolls, annual road taxes and fuel duties, road user pricing holds the promise of less traffic congestion, less environmental pollution, greater fairness, safer roads and better use of infrastructure resources.

Road user pricing may command general support, provided the privacy and fairness issues are solved. Privacy relates to the ability of a driver to choose to pay the proper price for a journey without being identified. Fairness relates to the difficulty of a dishonest driver avoiding payment without detection. Cost and environmental considerations may also be issues, particularly the cost and environmental impact of roadside equipment.

Known solutions generally fail to address satisfactorily the privacy, fairness, cost and environmental issues. Typically, such solutions are based on the installation in each vehicle of tamper-proof equipment, usually centered on a smart card issued by or on behalf of the highway authority, which records the journey made by each vehicle. Roadside equipment interacts with the onboard equipment to check that the onboard equipment is operating properly. The driver uploads the information on the smart card in order to be invoiced.

The drawbacks of the above approaches are a) it is not advisable to store data collected from the vehicles under the control of the users of the vehicles and b) the impossibility of tamper-proofing onboard units can lead to fraudulent recording and delayed reporting. A post-paying driver expecting a large bill can "lose" an on board unit smart card. If the charge for losing a card is larger than the maximum cost of the journeys that might have taken place, genuine loss/damage is unfairly penalized.

The deposit on a pre-payment card must be equally large, as a pre-paid on board unit smart card has no way of knowing when it is overspent, but might switch off after a predetermined amount of time or once a certain distance has been recorded.

The benefit of privacy-preserving technologies is severely restricted by the need to process the data pertaining to a vehicle's movement through a charging algorithm in a data centre. Both pre and post-payment methods are affected.

Expensive and intrusive roadside equipment is necessary for enforcement. Equipment must be deployed pervasively before a non-pilot scheme begins. The effectiveness of this approach in detecting evasion is limited.

DISCLOSURE OF THE INVENTION

Viewed from a first aspect, the present invention provides a method for the gathering of data from a plurality of vehicles, for use by a road use charging authority, comprising the steps of: periodically broadcasting data indicative of a vehicle and the vehicle's position for detection by other vehicles in the vehicle's vicinity; detecting data indicative of other vehicles in the vehicle's vicinity; and generating a record, the record comprising data gathered from the broadcasting step and the detecting step, which is periodically sent to a controller, at which, a determination is performed, as to whether records from other vehicles which have encountered the vehicle have been sent to the controller.

The present invention assumes that a road use charging authority imposes a charging tariff which encourages vehicles to record encounters and that a sufficient proportion of vehicles are diligent recording encounters.

The charging authority computes the charge payable, collects the charge from the owner of the vehicle, takes its percentage and passes the remainder of the revenue to the highway authority. Discounts would encourage early upload/payment. The charging system would also pass the uploaded encounter record to the enforcement system. The invention is self-enforcing to the extent that pricing discounts encourage diligent early uploading.

Preferably, the invention provides a method wherein the data indicative of the vehicle is determined by communicating with an onboard smart card unit.

Preferably, the present invention provides a method wherein the positional data is determined by communicating with a location determination device.

Preferably, the present invention provides a method wherein the gathered data comprises, the registration details, positional data and the time of the vehicle's encounter and the registration details of the other vehicle within the encounter.

Preferably, the present invention provides a method wherein the broadcast data comprises a digital signature.

Viewed from a second aspect the present invention provides a method for detecting anomalies in data gathered from a plurality of vehicles, by a road use charging authority, comprising the steps of: receiving a record from a vehicle, the record comprising data indicative of the vehicle and its position and data indicative of other vehicles which have encountered the vehicle within the vehicle's vicinity; and determining if records from other vehicles which have encountered the vehicle have been received by the controller.

Preferably, the present invention provides a method wherein on determining records from other vehicles which have encountered the vehicle and have been received by the controller, the vehicle's record and the other vehicles' records are deleted from a data store.

Preferably, the present invention provides a method wherein on determining records from other vehicles which have encountered the vehicle and have been received by the controller, the vehicle's record and the other vehicle's records are excluded from the charging process.

Preferably, the present invention provides a method wherein the determining step further comprises storing the vehicle's record in a second data store, if records from other vehicles which have encountered the vehicle have not been received by the controller.

Preferably, the present invention provides a method further comprising analyzing the vehicle's record, stored in the second data store, to obtain information pertaining to the other vehicle, involved in an encounter, whose record has not been received by the controller.

Preferably, the present invention provides a method wherein the identifying step is performed after a time period has lapsed.

Preferably, the present invention provides a method wherein the identified information comprises the other vehicle's registration details.

Preferably, the present invention provides a method wherein a notification is communicated to an entity of the other vehicle as determined by the other vehicle's registration details.

Viewed from a third aspect the present invention provides a computer program product loadable into the internal memory of a digital computer, comprising software code portions for performing, when said product is run on a computer, to carry out the invention of claims 1 to 13.

Viewed from a forth aspect the present invention provides a road use charging service for detecting anomalies in data gathered from a plurality of vehicles, the service comprising the steps of: receiving a record from a vehicle, the record comprising data indicative of the vehicle and its position and data indicative of other vehicles claiming to have encountered the vehicle within the vehicle's vicinity; determining if records from other vehicles which have encountered the vehicle have been received by the controller; and on detection of records not being received from other vehicles, asserting a charge on the detected vehicles.

Preferably, the present invention provides a service, wherein the asserted charge is a higher charge for the detected vehicles and a lower charge for the vehicle's for which records have been received.

Viewed from a fifth aspect, the present invention provides a system for the gathering of data from a plurality of vehicles, for use by a road use charging authority, the system comprising: a broadcasting component for periodically broadcasting data indicative of a vehicle and the vehicle's position for detection by other vehicles in the vehicle's vicinity; a detector component for detecting data indicative of other vehicles in the vehicle's vicinity; and a generator for generating a record, the record comprising data gathered from the broadcasting step and the detecting step, which is periodically sent to a controller, at which, a determination is performed, as to whether records from other vehicles which have encountered the vehicle have been sent to the controller.

Preferably, the present invention provides a system wherein the data indicative of the vehicle is determined by means for communicating with an onboard smart card unit.

Preferably, the present invention provides a system wherein the positional data is determined by means for communicating with a location determination device.

Preferably, the present invention provides a system wherein the gathered data comprises, the registration details, positional data and the time of the vehicle's encounter and the other vehicle's registration details.

Preferably, the present invention provides a system wherein the broadcast data comprises a digital signature.

Viewed from a sixth aspect the present invention provides a system for detecting anomalies in data gathered from a plurality of vehicles, by a charging authority, comprising: a receiver, for receiving a record from a vehicle, the record comprising data indicative of the vehicle and its position and data indicative of other vehicles claiming to have encountered the vehicle within the vehicle's vicinity; and a determiner, for determining if records from other vehicles which have encountered the vehicle have been received by the controller.

Preferably, the present invention provides a system wherein on determining if records from other vehicles which have encountered the vehicle have been received by the controller, comprises means for the vehicle's record and the other vehicles' records being deleted from a data store.

Preferably, the present invention provides a system wherein the determiner further comprises means for storing the vehicle's record in a second data store, if the records from other vehicles which have encountered the vehicle have not been received by the controller.

Preferably, the present invention provides a system further comprising analyzing the vehicle's record, stored in the second data store, to extract information pertaining to the other vehicle, involved in an encounter, whose record has not been received by the controller.

Preferably, the present invention provides a system, wherein the identifying step is performed after a time period has lapsed.

Preferably, the present invention provides a system wherein the identified information comprises the other vehicle's registration details.

Preferably, the present invention provides a system wherein a notification is communicated to a responsible entity of the other vehicle as determined by the other vehicle's registration details.

BRIEF DESCRIPTION OF THE DRAWINGS

Embodiments of the invention are described below in detail, by way of example only, with reference to the accompanying drawings in which.

DETAILED DESCRIPTION OF THE INVENTION

Figure 1:
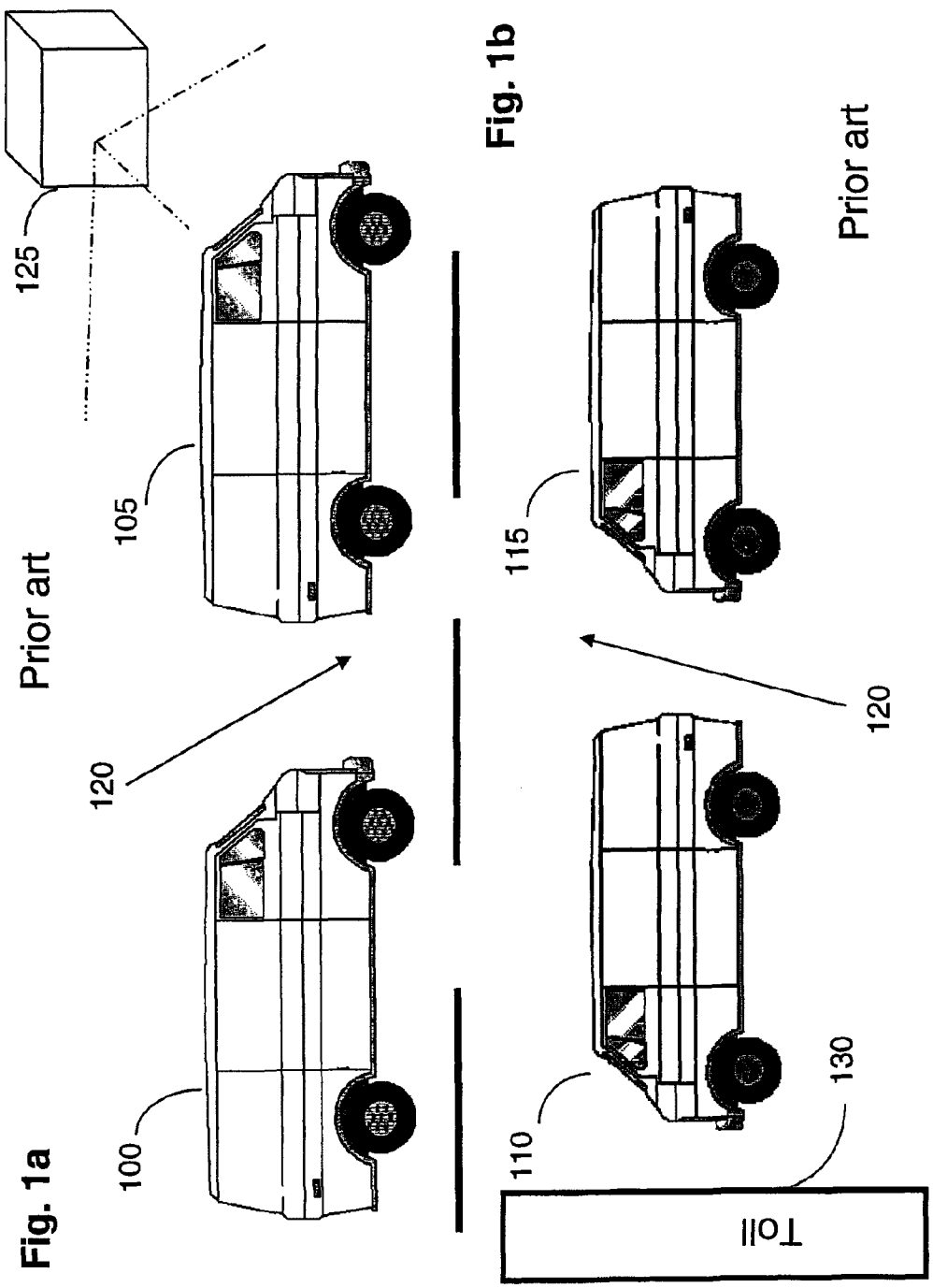
FIGS. 1a and 1b, illustrates a number of prior art road charging mechanisms.

FIGS. 1a and 1b show a number of prior art road charging mechanisms. In FIG. 1a, two vehicles 100, 105 are traveling along a road 120 towards an area of vehicle congestion. As the vehicles' enter into the area of vehicle congestion, a camera 125 is located along the side of the road, in order to take a photograph of the vehicle's 100, 105 registration plate. On receipt of the photograph, the registration plate details are extracted and a query is performed in a database to locate the registered owner of the vehicle 100, 105. Once the registered owner is located, a bill for the amount of the congestion charge is sent to the registered owner. Alternatively, an owner of a vehicle 100, 105 can pay in advance to the charging authority. Each time the vehicle 100, 105 enters into the congestion charging area, the amount of the congestion charge is debited from the amount of money that was paid in advance to the charging authority.

FIG. 1b shows two vehicles 110, 115 traveling along a road 120 towards a toll booth 130. Toll booths 130 are often found along roads where a charging authority feels that is appropriate to charge for the use of the road. This may be because the charging authority wishes to gain back revenue that was spent on building the road 120, or where, by applying a charge to the use of the road 120, traffic congestion will be reduced. Toll booths require an infrastructure to be placed across a road 120, in order to stop vehicles 110, 115 traveling along a road 120 until the vehicles 110, 115 have paid a fee.

In each of the examples above, the charging authority provide no provision for the privacy of the information pertaining to the registered owner of a vehicle. Further, particularly with reference to FIG. 1a, vehicle owners are extremely unhappy and wary of having their private details, for example, the location of a vehicle at a particular time, captured, stored and used without any personal control over the use of the information.

Figure 2:
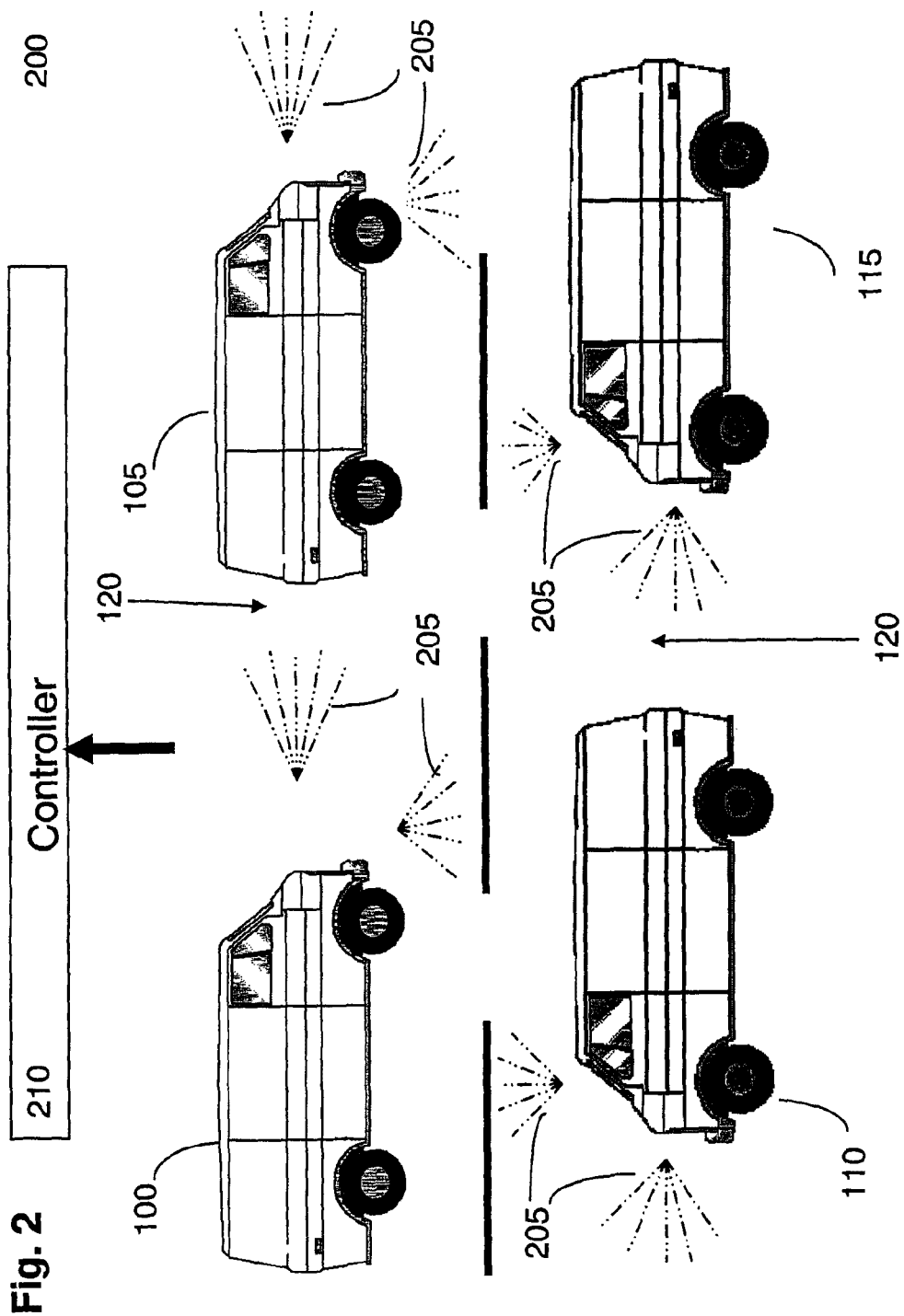
FIG. 2, illustrates the road use charging system of the present invention.

A charging system 200 is shown in FIG. 2, which provides a method and system for road use charging. As is shown in FIG. 2, the charging system 200 does not require any installation of roadside equipment or tamper-proof onboard equipment, apart from, preferably, a smartcard.

As is shown in FIG. 2, each vehicle 100 to 115 is required to broadcast 205 periodically, by for example, short range radio, its position (i.e., location) and registration details. Preferably, the broadcast comprises a digital signature, for digitally signing the broadcast, in such a manner that the digital signature provides assurance that the driver or owner of the vehicle may be identified.

The vehicle 100-115 may broadcast 205 other information indicative of itself, for example, the vehicle's speed, direction and the time of the day. Alternatively, when operating in a road use charging environment, a charging band may also be broadcast 205. A charging band may comprise banding vehicles 100-115 according to their emission type.

In order to determine the position, speed, bearing and a time of day for a vehicle 100-115, an onboard processing device, for example, a smart card, communicates with a Global Positioning System (GPS) system for determining the speed, the date and time of the vehicle 100-115.

The road use charging system 200 may broadcast 205 a radio signal over a predetermined time period. Over what time period the radio signal may be broadcasted and when, may be determined by, the distance traveled by the vehicle, how long the vehicle has been traveling for, or alternatively, when the vehicle travels into a zone. For example, a geographical region may be divided into areas, each area measuring, for example, 200 meters square. As a vehicle enters a zone, the vehicle may broadcast its data. As a vehicle leaves one zone and moves into another zone, the vehicle, once again, may broadcast its data.

A vehicle 100-115 not broadcasting 205 the correct information, or not broadcasting 205 at all, will be deterred by the possibility of detection by police or other vehicles 100 to 115 and of consequent prosecution for a road traffic or tax evasion offence.

As well as broadcasting 205 information, each vehicle 110-115 is required to detect and receive information broadcasted 205 from other vehicles. Each vehicle 100-115 is required to detect and receive broadcasted information 205 periodically. Preferably, each vehicle 110-115 is required to negotiate with other vehicles 110-115 within its vicinity. Preferably, a vehicle 'pairs' with the vehicle broadcasting immediately before it, in its vicinity in order to establish an encounter.

The vicinity may be defined by a charging authority, for example by using grid references to denote charging areas. Each vehicle 110-115 negotiates with a nearby vehicle 110-115 to establish an "encounter". Failure to participate, or not to attempt to participate, in this interaction may be considered as a road traffic or tax evasion offence. A vehicle 110-115 may refuse to establish an encounter with another vehicle 110-115 whose position co-ordinates are not credible, for example, another vehicle that is not within a few tens of meters of its own vehicle. Once an encounter has been determined, preferably, a record is generated. The record may be stored in a computer-readable storage medium of the apparatus 300 (see FIG. 3) for a number or days, weeks or months before uploading to the charging authority 200. The record may comprise the broadcasted data and the data received from other vehicles for transmitting to the charging authority 210. On receipt of the data, the charging authority 200 calculates the road use charge for the vehicle from which the data that was uploaded, accumulates journey information for the vehicles, which the uploading vehicle claims to have encountered, so that they too can in due course be charged and detects anomalies within the uploaded records. For example, a Vehicle A may establish an encounter with a Vehicle B. Vehicle A uploads its record so that Vehicle A is charged, but also, so that Vehicle B is charged.

The record may comprise data indicative of a series of encounters recorded throughout a journey, time period or a zone, or alternatively, just one encounter. A part of a record may be uploaded, for example, data indicative of a few encounters, or all of a record may be uploaded. The record may be uploaded by the owner of the vehicle, the driver or anyone else. The record may be uploaded via a smartcard.

Figure 3:
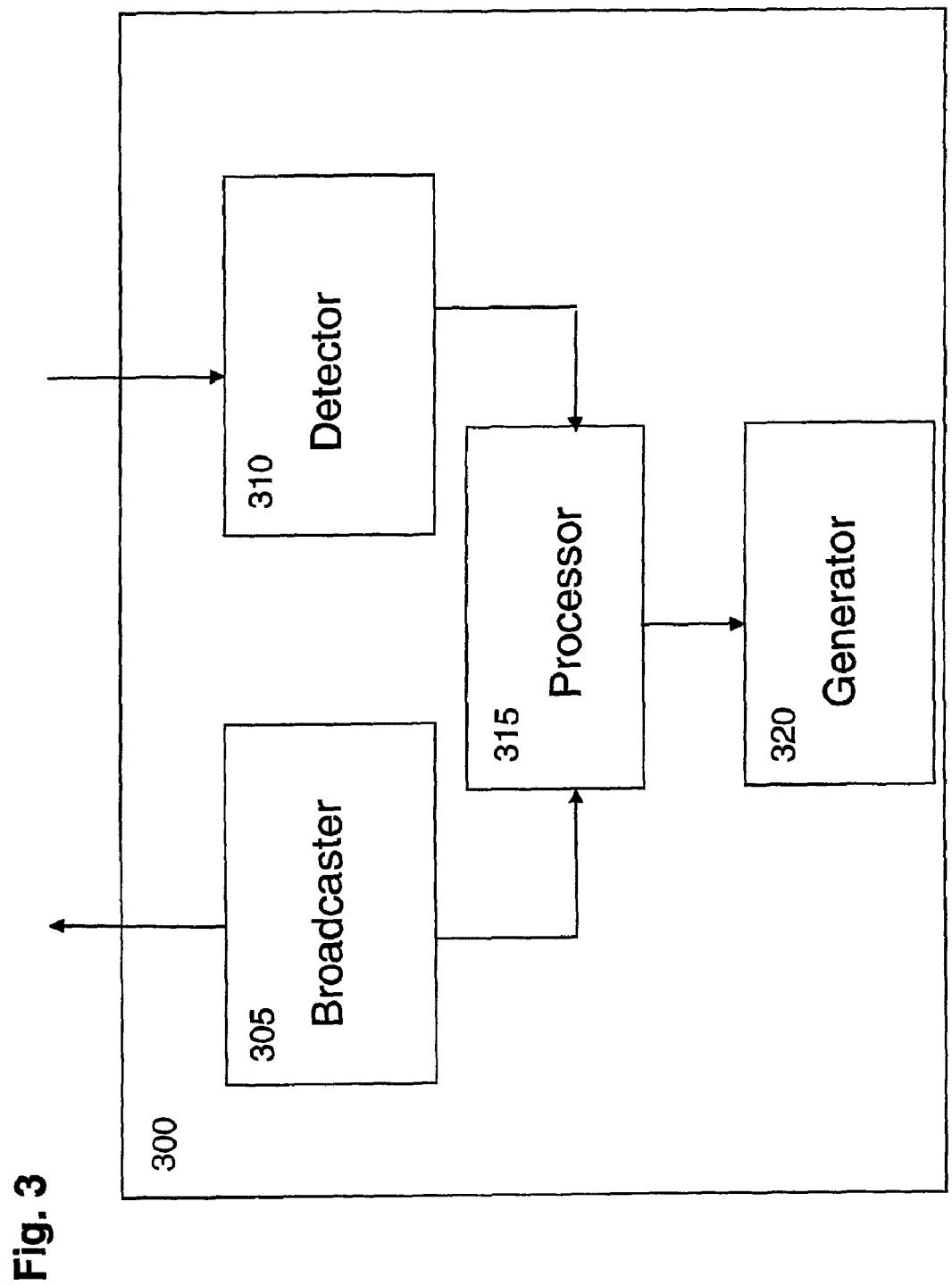
FIG. 3, illustrates the sub components of the road use charging system located within a vehicle.

Moving on to FIG. 3, the components comprised by the charging system 200 as located within a vehicle 100-115 are shown as apparatus 300. The apparatus 300 comprises a broadcast component 305 for broadcasting information indicative of the vehicle's 100 position, speed, direction of motion and charging band etc, a detector component 310 for detecting and receiving information broadcasted 205 from other vehicles 105,110,115 in the vehicle's 100 vicinity, a processing component 315 for processing the encounter record between two vehicles 110, 115, and a generator component 320 for generating a record pertaining to the encounter. The detector component 310 may be referred to as a receiver component 310.

The broadcast 305 component broadcasts information indicative of the vehicle's position and, for example, its speed, direction of motion, charging band and a digital signature etc. The broadcasted information can be any information that a charging authority 210 requires to ensure a fair charging policy. The broadcasting component 305 receives data from a GPS system for receiving a set of GPS coordinates pertaining to the vehicle's (100) speed and position. The broadcast component 305 further communicates with a vehicle's GPS system, for requesting and receiving information pertaining to the current date and time. Once the information has been gathered the broadcast component 305 packages the received information into a payload for broadcasting via a radio wave mechanism for receiving by another vehicle 105, 110, 115 in its vicinity. The detector component 310 detects other payloads from other vehicles 105,110,115 within its vicinity. On receipt of a payload from another vehicle 105, 110 115, the detector component 310 communicates to the processing component 315 to signal that a payload, (signifying an encounter) has been received.

The generator component 320 records the time of the encounter, the positional co-ordinates of both vehicles 110, 115 and the registration details and/or the digital signature of the other vehicle 110. In another embodiment, the charging band of the other vehicle 110, and the speed and bearing of both vehicles 110, 115 may also be recorded.

At a convenient time, for example, when the vehicle 100 is being refueled, the vehicle driver will upload the encounter record to a charging system, such as by using the charging apparatus 300 to upload the encounter record to the charging system. Such an upload could be anonymous, for example, when paying cash at a refueling station. All encounter records may be uploaded or just a subset of encounter records may be uploaded.

Figure 4:
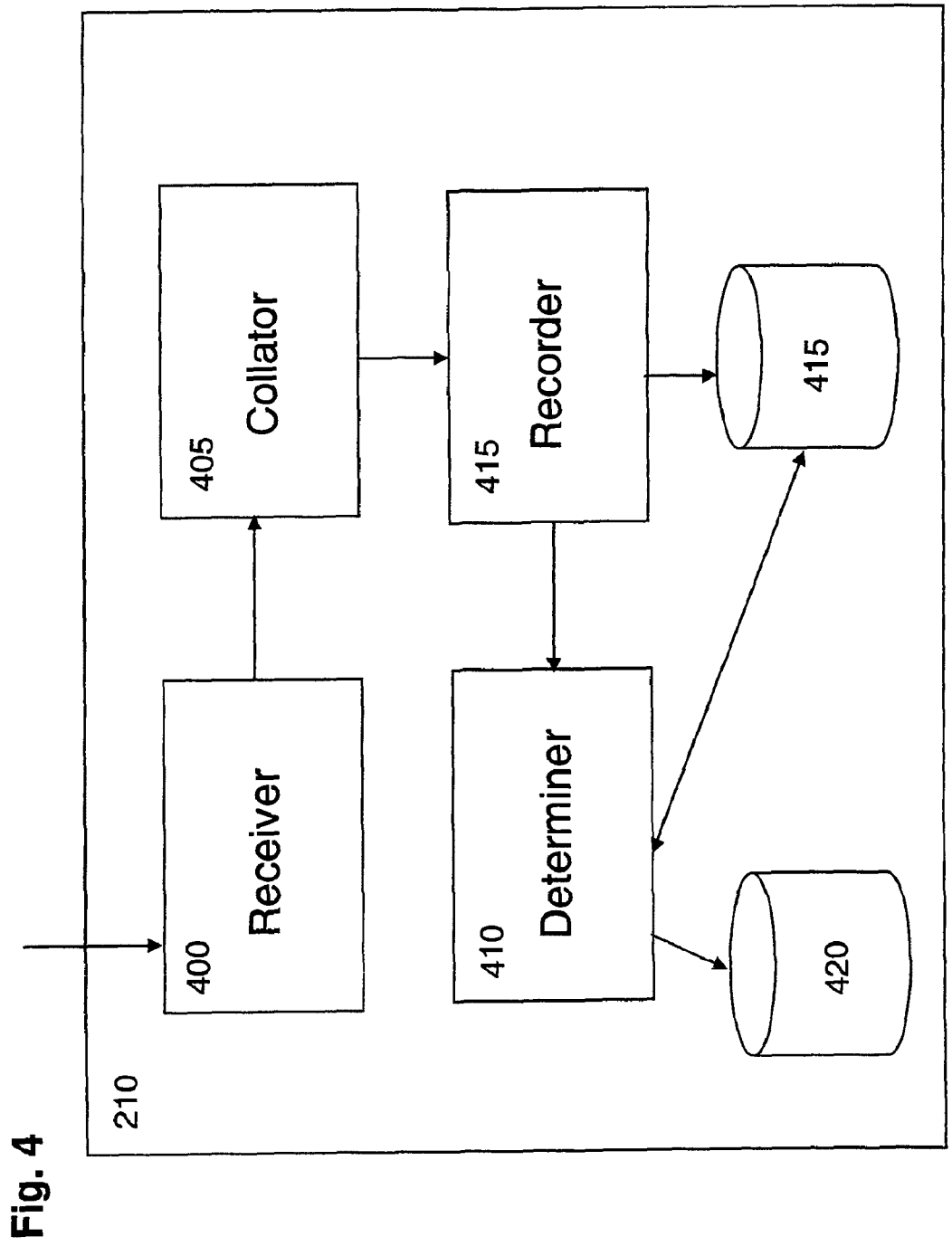
FIG. 4, illustrates the sub components of the road use charging system of the charging authority.

The charging authority 210 receives the uploaded encounter records and processes each encounter record to detect any anomalies. These steps are explained with reference to FIG. 4, which illustrates the individual components of the charging system of the charging authority 210. A receiver component 400 receives the uploaded encounter records and performs a check to ensure that the uploaded encounter records comprise the correct information. For example, that the positional co-ordinates are valid co-ordinates etc. The uploaded encounter records are communicated to a collator component 405 for queuing for communicating to a recorder component 415 for storing in a temporary data store 420. A determiner component 410 examines each encounter record.

For each encounter, the determination component 410 determines whether another vehicle 110 has already uploaded its appropriate encounter record. If the appropriate encounter record is determined to have already been uploaded the corresponding encounter record is discounted from the charging process and/or deleted irrevocably, in order to preserve privacy. If the determiner component 410 determines that the corresponding encounter record has not been previously uploaded, the encounter record is stored in a temporary database 420. The privacy properties derive from the temporary nature of the data in the temporary database, and the irrevocable deletion of entries.

It will be appreciated by a person skilled in the art that the above components may function in any order and the order is not limited to the order as disclosed above.

After a designated period of time or at one or more designated times, the determiner component 410 performs a query in the temporary database 420 to determine a set of records that have, over the designated period of time, not had a corresponding encounter record uploaded i.e. an earlier paid broadcast uploaded. For example, encounter record A from vehicle 100 is uploaded to the charging authority 210. The encounter record states that an encounter was recorded between vehicle B 110. The encounter record can be used to identify and thus contact the driver or the registered owner of vehicle B 110. The determiner component 410 determines after a period of time that no corresponding encounter record was uploaded for vehicle B 110. In another embodiment owners of vehicles 110-115 who promptly upload their encounter records are rewarded by being given a discounted rate of road charge. Conversely, owners of vehicles who are not diligent in uploading their encounter records may be penalized by being charged at an undiscounted rate.

Figure 5:
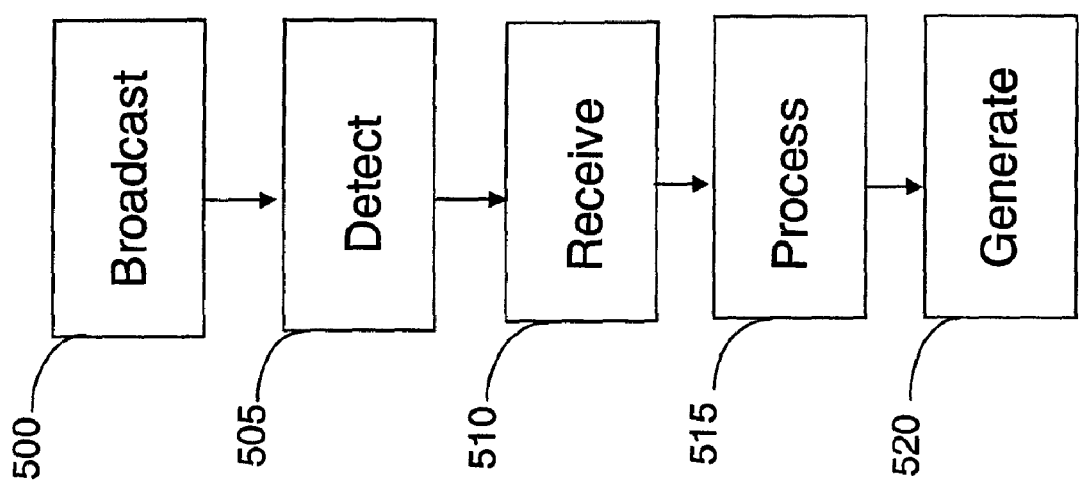
FIG. 5, illustrates the operational steps of the road use charging system located within a vehicle.
Figure 6:
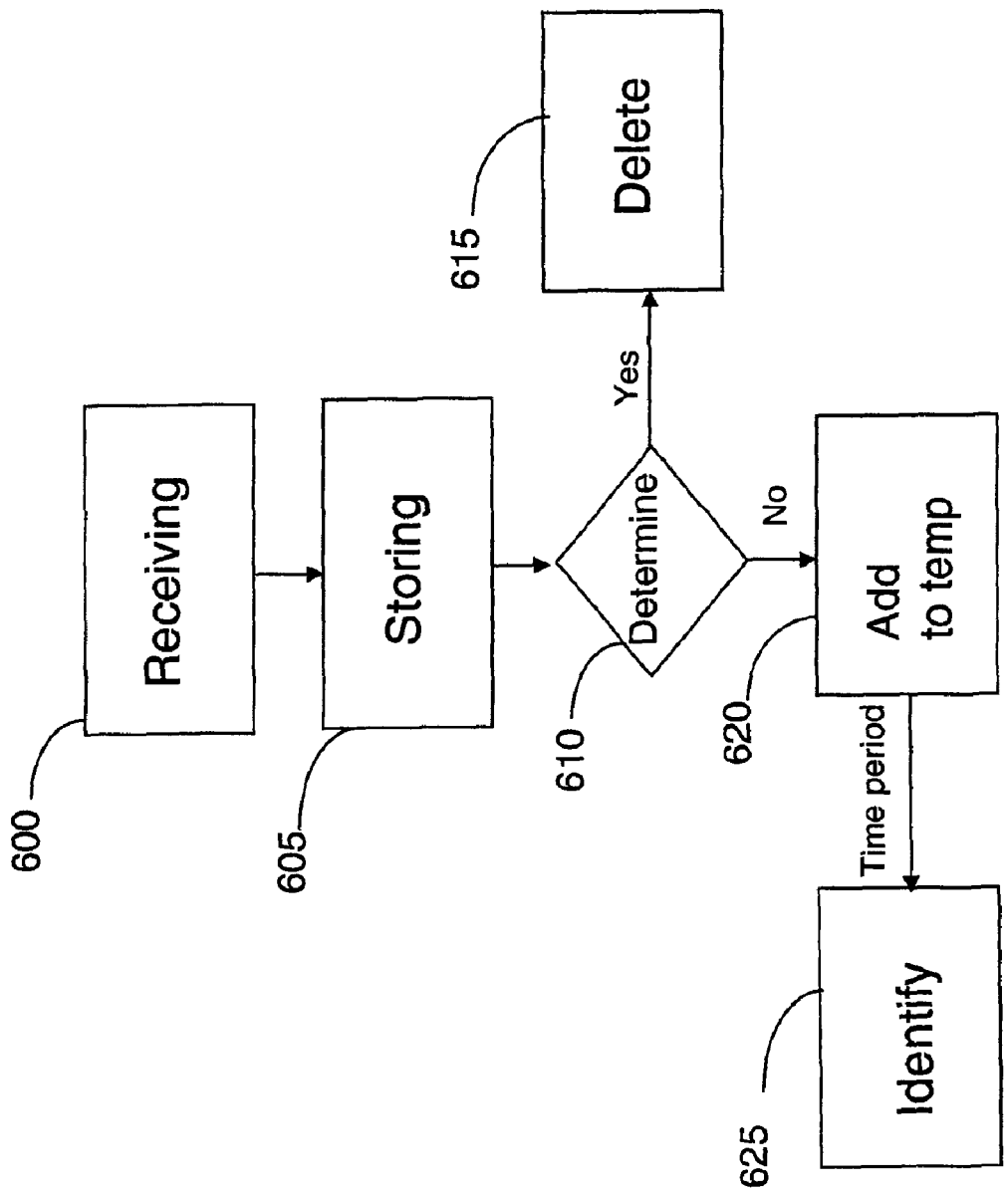
FIG. 6, illustrates the operational steps of the road use charging system of the charging authority.

The operational steps of the charging system will now be explained with reference to FIGS. 5 and 6.

As a vehicle 110 travels along a route 120, the broadcast component 305, gathers information indicative of the vehicle and its position. The broadcast component 305 broadcasts 205 the information to other vehicles 105,110,115 within its vicinity over a predetermined amount of time, at step 500. A detector component 310 detects other vehicles 105,110,115 broadcasting 205 information within the vehicle's 100 vicinity, at step 505. The detector component 310 receives the broadcasted information pertaining to the detected vehicle, at step 510 and signals to the processing component 315 to process the encounter record.

An example of an encounter records is as follows:

Encounter Record

| Vehicle A (ref numeral 100) | |
| --- | --- |
| Date and time | 15/10/2008 12:00:01 |
| Positional coordinates | UK 413000 241550 |
| Charging band | A 154 gm/km |

| Vehicle B (reference numeral 110) | |
| --- | --- |
| Date and time | 15/10/2008 12:00:00 |
| Positional coordinates | UK 413200 241590 |
| Digital signature | x'A123456789 . . . |

An encounter record comprises data pertaining to two vehicles 100, 110 which have broadcasted information about themselves. The first line of the encounter record comprises data pertaining to the vehicle 100 that has generated the encounter record. This is always the vehicle 100 that broadcasted information indicative of itself and in response detected broadcasted data from other vehicles 110. The encounter record may comprise the date and time of the encounter between vehicle 100 and the vehicle 110, the positional coordinates of the vehicle 100 and the charging band of the vehicle 100, if appropriate. Following these details, are the details broadcasted from another vehicle 110, in this example vehicle B 110. The details pertaining to vehicle B 110 may comprise the date and time of the encounter, the positional coordinates of the vehicle at the date and time of the encounter and the digital signature of vehicle B's broadcasted data. It will be appreciated by a person skilled in the art the other information may be recorded in an encounter record.

The encounter record is uploaded to the charging authority 210. With reference to FIG. 6, the receiver component 400 receives the encounter record at step 600 and passes the encounter record to the collator component 405 for checking whether the information is correct, in the appropriate format and for extracting the details about the entity that should be charged for road use. Control moves to control 610 and the determiner component 410 determines whether a corresponding encounter record has been stored in the temporary data store 420. If the determination is positive (i.e. an encounter record has been located), control passes to step 615 and the encounter record is excluded from the charging process and/or deleted from the temporary data store 420. If the determination is negative (i.e. an encounter record has not been located), control moves to step 620 and the encounter record is stored in a temporary data store 420.

After a predetermined amount of time has passed, the determination component 410 performs a query on the temporary data store 420 and identifies which encounter records have not had a corresponding encounter record uploaded to the charging authority 210, at step 625.

The invention claimed is:

1. A computer program product loadable into the internal memory of a digital computer, comprising software code portions for performing, when said product is run on the digital computer, a method for processing road use data by a first apparatus within a first moving vehicle, said method comprising:

transmitting, by the first apparatus, a set of broadcasts to at least one vehicle in motion located in a vicinity of the first moving vehicle at a time of said transmitting, wherein the set of broadcasts consists of a single broadcast or a time-sequenced series of broadcasts, and wherein each broadcast in the set comprises broadcast data that includes a location and identifier of the first moving vehicle;

receiving, by the first apparatus, a broadcast of broadcast data from each vehicle in motion in conjunction with an encounter between the first moving vehicle and each corresponding vehicle in motion, wherein the broadcast data from each vehicle in motion includes a location and identifier of said each vehicle in motion; and generating, by the first apparatus, a set of encounter records such that each encounter record pertains to the encounter between the first moving vehicle and the corresponding vehicle in motion, wherein each encounter record includes encounter data that comprises: (1) the location of the first moving vehicle in the broadcast data of the broadcast transmitted by the first moving vehicle to the corresponding vehicle in motion, and (2) the location and identifier of the corresponding vehicle in motion in the broadcast data of the broadcast received by the first moving vehicle from the corresponding vehicle in motion; and storing in the first apparatus the set of encounter records, said storing being performed by the first apparatus.

2. The computer program product of claim 1, wherein each broadcast received by the first moving vehicle, from the corresponding vehicle in motion pertaining to each encounter, further comprises a date and time of the encounter between the first moving vehicle and each corresponding vehicle in motion; and wherein the encounter data of each encounter record further comprises: (1) the date and time of the encounter between the first moving vehicle and each corresponding vehicle in motion in the broadcast data of the broadcast transmitted by the first moving vehicle to the corresponding vehicle in motion and (2) the date and time of the encounter between the first moving vehicle and each corresponding vehicle in motion in the broadcast data of the broadcast received by the first moving vehicle from the corresponding vehicle in motion.

3. The computer program product of claim 2, wherein each broadcast of the set of broadcasts further comprises a speed and direction of motion of the first moving vehicle;

wherein each broadcast received by the first moving vehicle, from the corresponding vehicle in motion pertaining to each encounter, further comprises a speed and direction of motion of said each corresponding vehicle in motion; and wherein the encounter data of each encounter record further comprises additional data pertaining to said each encounter, wherein the additional data is selected from the group consisting of the speed of the first moving vehicle, the direction of motion of the first moving vehicle, the speed of said each corresponding vehicle in motion, the direction of motion of said each corresponding vehicle in motion, and combinations thereof.

4. The computer program product of claim 1, wherein the method further comprises sending, by the first apparatus, the set of encounter records to a charging system of a road use charging authority, said charging system configured to determine a road use charge with respect to the first owner, said road use charge with respect to the first owner being based on content in the encounter records received by the charging system from the first apparatus.

5. A method for processing road use data by a charging system of a road use charging authority, said method comprising:

receiving, by the charging system, a first encounter record from a first moving vehicle, wherein the first encounter record includes first encounter data pertaining to an encounter that occurred between the first vehicle and a second vehicle while the first and second vehicles were both moving and while the second vehicle was located within a vicinity of the first vehicle, and wherein the first encounter data comprises (1) a location of the first vehicle during the encounter, and (2) a location and identifier of the second vehicle during the encounter;

responsive to said receiving, determining, by the charging system, whether a data store of the charging system comprises a second encounter record previously received by the charging system from the second vehicle such that the second encounter record includes second encounter data pertaining to the encounter;

if said determining determines that the data store comprises the second encounter record, then excluding the second encounter record from being used in a charging process that charges the first and second vehicles for road use with respect to the encounter and/or deleting the second encounter record from the data store, said excluding and/or deleting being performed by the charging system;

if said determining determines that the data store does not comprise the second encounter record, then storing the first encounter record in the data store, said storing being performed by the charging system.

6. The method of claim 5, wherein said determining determines that the data store comprises the second encounter record.

7. The method of claim 5, wherein said determining determines that the data store does not comprise the second encounter record.

8. The method of claim 7, wherein the method further comprises:

after said determining, calculating a road use charge for the first vehicle, said calculating the road use charge for the first vehicle being performed by the charging system.

9. The method of claim 8, wherein the method further comprises:

after a designated period of time following said determining that the data store does not comprise the second encounter record, ascertaining, by the charging system, that the second encounter record has not been received by the charging system from the second vehicle; and after said ascertaining that the second encounter record has not been received by the charging system from the second vehicle, calculating a road use charge for the second vehicle that is higher than the calculated road use charge for the first vehicle, said calculating the road use charge for the second vehicle being performed by the charging system.

10. The method of claim 5, wherein the first encounter record comprises a digital signature.

11. The method of claim 5, wherein the first encounter data further comprises:

a date and time of day of the encounter as broadcasted by the first vehicle to the second vehicle; and a date and time of day of the encounter as broadcasted by the second vehicle to the first vehicle.

12. The method of claim 11, wherein the first encounter data further comprises:

a speed and direction of motion of the first vehicle as previously broadcasted by the first vehicle to the second vehicle; and a speed and direction of motion of the second vehicle as previously broadcasted by the second vehicle to the first vehicle.

13. A method for processing road use data by a first apparatus within a first moving vehicle, said method comprising:

transmitting, by the first apparatus, a set of broadcasts to at least one vehicle in motion located in a vicinity of the first moving vehicle at a time of said transmitting, wherein the set of broadcasts consists of a single broadcast or a time-sequenced series of broadcasts, and wherein each broadcast in the set comprises broadcast data that includes a location and identifier of the first moving vehicle;

receiving, by the first apparatus, a broadcast of broadcast data from each vehicle in motion in conjunction with an encounter between the first moving vehicle and each corresponding vehicle in motion, wherein the broadcast data from each vehicle in motion includes a location and identifier of said each vehicle in motion; and generating, by the first apparatus, a set of encounter records such that each encounter record pertains to the encounter between the first moving vehicle and the corresponding vehicle in motion, wherein each encounter record includes encounter data that comprises: (1) the location of the first moving vehicle in the broadcast data of the broadcast transmitted by the first moving vehicle to the corresponding vehicle in motion, and (2) the location and identifier of the corresponding vehicle in motion in the broadcast data of the broadcast received by the first moving vehicle from the corresponding vehicle in motion; and storing in the first apparatus the set of encounter records, said storing being performed by the first apparatus.

14. The method of claim 13, wherein each broadcast of the set of broadcasts is digitally signed with a digital signature;

wherein each broadcast received by the first moving vehicle, from the vehicle in motion pertaining to each encounter, is digitally signed with a corresponding digital signature; and wherein each encounter record comprises the corresponding digital signature for the broadcast received by the first moving vehicle from the corresponding vehicle in motion.

15. The method of claim 14, wherein the digital signature in each broadcast of the set of broadcasts identifies an owner or a driver of the first moving vehicle, and wherein the corresponding digital signature in each broadcast received by the first moving vehicle, from the corresponding vehicle in motion pertaining to each encounter, identifies an owner or a driver of the corresponding vehicle in motion.

16. The method of claim 13, wherein each broadcast received by the first moving vehicle, from the corresponding vehicle in motion pertaining to each encounter, further comprises a date and time of the encounter between the first moving vehicle and each corresponding vehicle in motion; and wherein the encounter data of each encounter record further comprises: (1) the date and time of the encounter between the first moving vehicle and each corresponding vehicle in motion in the broadcast data of the broadcast transmitted by the first moving vehicle to the corresponding vehicle in motion and (2) the date and time of the encounter between the first moving vehicle and each corresponding vehicle in motion in the broadcast data of the broadcast received by the first moving vehicle from the corresponding vehicle in motion.

17. The method of claim 16, wherein each broadcast of the set of broadcasts further comprises a speed and direction of motion of the first moving vehicle;

wherein each broadcast received by the first moving vehicle, from the corresponding vehicle in motion pertaining to each encounter, further comprises a speed and direction of motion of said each corresponding vehicle in motion; and wherein the encounter data of each encounter record further comprises additional data pertaining to said each encounter, wherein the additional data is selected from the group consisting of the speed of the first moving vehicle, the direction of motion of the first moving vehicle, the speed of said each corresponding vehicle in motion, the direction of motion of said each corresponding vehicle in motion, and combinations thereof.

18. The method of claim 17, wherein the method further comprises prior to said transmitting each broadcast for each encounter:

receiving, by the first moving vehicle from a Global Positioning System (GPS), the date and time of day of said each encounter and GPS coordinates pertaining to the speed of and direction of motion of the first moving vehicle with respect to said each encounter.

19. The method of claim 13, wherein the method further comprises sending, by the first apparatus, the set of encounter records to a charging system of a road use charging authority, said charging system configured to determine a road use charge with respect to the first owner, said road use charge with respect to the first owner being based on content in the encounter records received by the charging system from the first apparatus.

20. The method of claim 13, wherein the set of broadcasts consists of the time-sequenced series of broadcasts.

21. The method of claim 20, wherein a timing of said transmitting the broadcasts in the time-sequenced series of broadcasts is determined by distance traveled by the first moving vehicle.

22. The method of claim 20, wherein a timing of said transmitting the broadcasts in the time-sequenced series of broadcasts is determined by how long the first moving vehicle has been moving.

23. The method of claim 20, wherein a geographical area is divided into zones, and wherein a timing of said transmitting the broadcasts in the time-sequenced series of broadcasts is a function of when the first moving vehicle enters each zone of the geographical area.

24. The method of claim 20, wherein the method further comprises:

prior to said receiving the broadcast of broadcast data from each vehicle in motion in conjunction with the encounter between the first moving vehicle and each corresponding vehicle in motion, negotiating the encounter between the first moving vehicle and each corresponding vehicle in motion.

* * * * *